United States Patent [19]
Srikant et al.

[11] Patent Number: 5,805,681
[45] Date of Patent: Sep. 8, 1998

[54] SYSTEMS AND METHODS FOR ESTIMATING A BLOCKING PROBABILITY

[75] Inventors: Rayadurgam Srikant, Urbana, Ill.; Ward Whitt, Basking Ridge, N.J.

[73] Assignee: Lucent Technologies Inc., Murray Hill, N.J.

[21] Appl. No.: 732,961

[22] Filed: Oct. 17, 1996

[51] Int. Cl.⁶ .................................................. H04M 15/00
[52] U.S. Cl. ........................ 379/133; 379/113; 379/137; 379/139; 379/112; 379/111
[58] Field of Search ..................... 379/113, 230, 379/133, 111, 112, 137, 139, 138, 219–229, 188, 34

[56] References Cited

U.S. PATENT DOCUMENTS

| | | | |
|---|---|---|---|
| 4,613,729 | 9/1986 | Daisenberger | 379/113 |
| 4,669,113 | 5/1987 | Ash et al. | 379/113 |
| 4,723,270 | 2/1988 | Okamoto et al. | 379/113 |
| 4,788,721 | 11/1988 | Krishnan et al. | 379/221 |
| 4,931,941 | 6/1990 | Krishnan | 379/113 |
| 4,979,118 | 12/1990 | Kheradpir | 379/220 |
| 4,991,204 | 2/1991 | Yamamoto et al. | 379/221 |
| 5,042,064 | 8/1991 | Chung et al. | 379/113 |
| 5,166,894 | 11/1992 | Saito | 379/197 |
| 5,185,780 | 2/1993 | Leggett | 379/113 |
| 5,289,368 | 2/1994 | Jordan et al. | 379/113 |
| 5,295,183 | 3/1994 | Langlois et al. | 379/113 |
| 5,359,649 | 10/1994 | Rosu et al. | 379/220 |
| 5,377,186 | 12/1994 | Wegner et al. | 379/207 |
| 5,550,903 | 8/1996 | Chang | 379/111 |
| 5,727,051 | 3/1998 | Holender | 379/113 |

OTHER PUBLICATIONS

P.W. Glynn and W. Whitt, "Indirect estimation via $L=\mu W$," *Operations Research*, vol. 37, No. 1, Jan.–Feb. 1989, pp. 82–103.

R.W. Ros, *Multiservice Loss Models for Broadband Telecommunication Networks*, Springer–Verlag London Limited 1995.

R. Srikant and W. Whitt, "Stimulation run lengths to estimate blocking probabilities," *ACM Transactions on Modeling and Computer Simulation*, vol. 6, No. 1, Jan. 1996, pp. 7–52.

*Primary Examiner*—Curtis A. Kuntz
*Assistant Examiner*—Rexford N. Barnie

[57] ABSTRACT

A system for, and method of operation of, estimating a blocking probability for at least a portion of a network and a model of the same are provided. The blocking probability represents a likelihood that a transmitted signal will arrive at least at the portion of the network. The system includes an estimator controller and a processing controller. The estimator controller derives both a direct and an indirect estimator. The direct controller is derived as a function of a number of losses and arrivals occurring with respect to at least the portion of the network during a period of time, and the indirect estimator is derived as a function of an offered load with respect to at least the portion of the network during the period of time. The processing controller, that is associated with the estimator controller, applies a weighting factor to the direct and indirect estimators to derive the blocking probability. The weighting factor minimizes variance of combined estimates.

21 Claims, 3 Drawing Sheets

5,805,681

SYSTEMS AND METHODS FOR ESTIMATING A BLOCKING PROBABILITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD OF THE INVENTION

The present invention is directed, in general, to networks and, more specifically, to systems and methods for estimating a blocking probability associated with networks and models of networks, such as communication, transportation, emergency response and other networks.

BACKGROUND OF THE INVENTION

Modern day networks, such as communication, transportation, emergency response and other networks, are extremely complex. Communication networks, for example, are often distributed over great distances and consist of vast numbers of transmission mediums and switching equipment. The complex combination of network switching equipment and transmission mediums, and the different capacities and other physical characteristics of each, often determines the capacity of the same.

Networks are commonly designed to support a particular capacity, or rate use, of network traffic. If this capacity is exceeded, communication signals, emergency vehicles, transportation units or the like may be "blocked." To continue with the above example, there are many locations within a communication network where calls may be blocked, the blocking location may occur at a user's telephone switch, at the user's local central office, or at some other junction point along the network. Blocking may occur because a switching or transmission capacity associated with part of the network is not presently available.

A blocking probability is the proportion of arrivals that are blocked. A "grade of service" for the network as a whole, or for a particular class of customers, may be specified in terms of blocking probabilities. This may be the long-run proportion or expected portion of transmitted signals blocked.

In a communication network, blocked calls are different from calls that simply have not completed because the called number is busy. Numbers that are busy are not the fault of a telephone switching and transmission network. From a user's point of view, the less blockage the better; less blockage and less frustration. From the perspective of the communication network provider, however, the network becomes more and more expensive as the switching and transmission network is designed for greater capacity and, reciprocally, less utilization and blocking.

Network providers design their networks based on trade-offs based largely on that which their customers are willing to tolerate and that which they are willing to pay for. Some conventional network designs provide different grades of service to different customers, or classes of customers, wherein the blocking probability is not the same for all traffic. It is desirable, under such circumstances, to determine a realized blocking probability for different customers and classes of customers, as well as for a portion of the network or the network as a whole. Blocking probabilities may vary from the ideal value of zero, corresponding to the best but most expensive solution, to one, corresponding to a worst case where all calls are blocked.

In designing a network, the most common design method involves modeling the network, often based on well known principles of queuing theory. Three primary variables are typically considered during this modeling process. An "arrival," or "input," process variable describes the way users request service. A "service" process variable describes the way servers handle the users when they leave the queue and enter the service-providing mechanism. A "queue discipline" variable describes the order in which users are selected to begin service. A common service discipline is first-come first-served, alternatives range from a random order of service to any of a variety of conventional priority schemes.

Network providers apply different formulas corresponding to their assumption about how users will respond to blockage. Networks are typically one of a "loss system," a "delay system" or a combination of the two. According to the communication network example above, and assuming a loss system, when a caller encounters blockage, the call is turned away, typically a "fast busy" tone signals that all trunks are busy. In a delay system the system holds a blocked call in queue until a server is available. In the combination loss/delay system, a finite waiting room is typically included that enables callers that find all servers busy to wait for a free server, however, when the waiting room is full, new arrivals are typically turned away, allowing losses to occur with or without delay.

To determine the likely blocking probability of a complicated system, conventional network modeling tools are used to construct a mathematical model of the network. The operation of this network model is then simulated on a computer, often as a stochastic process, wherein the randomness of different simulations of the same system will result in variations in a predicted blocking probability. To improve results, network designers often choose to run multiple simulations over an extended period of time, from which the individual blocking probabilities of each simulation may be averaged to determine a theoretically more accurate blocking probability. Alternatively, network designers may run a single simulation for a sufficiently long time period to accurately predict the blocking probability. In either case, however, the time necessary to determine an accurate estimate for the blocking probability can be prohibitively long. If a network designer should choose to run a simulation over a short time interval, he will likely encounter unacceptably long variances in the values of blocking probabilities realized during individual simulations. There accordingly exists a need in the art for a method, and system implementing the method, for determining low variance blocking probability estimates in a short period of time.

SUMMARY OF THE INVENTION

To address the above-discussed deficiencies of the prior art, the present invention provides systems for, and methods of operation of, estimating a blocking probability of at least a portion of a model of a network or at least a portion of a network. Exemplary networks include communication networks, transportation networks, emergency response networks and other conventional networks susceptible to blocking. A primary object of the present invention is to obtain low variance estimates for a given observation period or, alternatively, the same variance estimates within a shorter observation period than conventional methodologies.

An exemplary modeling system according to the present invention estimates a blocking probability associated with at least a portion of a model of a network. The blocking probability represents a likelihood that a transmitted signal will arrive at least at the portion of the network modeled. The modeling system includes an estimator controller and a processing controller. Each controller according to the present invention may be hardware-, firmware- or software-based.

The estimator controller derives both a direct and an indirect estimator. The direct estimator is derived as a function of a number of losses and arrivals occurring with respect to at least the portion of the network during a period of time, while the indirect estimator is derived as a function of an offered load with respect to at least the portion of the network during the same period of time. The processing controller, which is associated with the estimator controller, applies a weighting factor to the direct and indirect estimators to derive the blocking probability that a transmitted signal will arrive at least at the portion of the communication network. In an advantageous embodiment, the weighting factor is chosen to minimize the variance of the combined estimates.

In an advantageous embodiment of the modeling system, the processing controller uses the blocking probability to one of: evaluate at least the portion of the network modeled, or modify at least one parameter of the model, wherein the parameter represents some physical aspect of the network. Evaluation enables the network designer to determine whether a particular network design is viable while modification allows the network designer to evaluate alternative embodiments of the network design under consideration.

In an alternate advantageous embodiment, the estimator controller uses a ratio of a first quantity of signals transmitted to at least the portion of the network modeled that are blocked to a second quantity of signals transmitted to at least the portion that arrive during the time period. In a related embodiment, the modeling system further includes a memory that is associated with the estimator controller, wherein the memory stores an arrival rate and an average holding time and the estimator controller retrieves the arrival rate and the average holding time from the memory and derives the offered load as a function thereof.

In an alternate advantageous embodiment, the estimator controller derives the indirect estimator as a function of an expected quantity of users of the network modeled during the time period.

It should be noted that an alternate exemplary system according to the present invention may suitably be implemented within a conventional network susceptible to blocking to estimate a low-variance blocking probability associated with at least a portion of the network. The blocking probability again represents a likelihood that a transmitted signal will arrive at least at the portion of the network. The system similarly includes each of an estimator controller, a processing controller and a control routing controller.

The foregoing has outlined, rather broadly, certain advantageous and alternative features of the present invention so that those skilled in the art may better understand the detailed description of the invention that follows. The present invention is described in the context of a communication network although the principles of the same may suitably be applied to transportation, emergency response and other conventional networks susceptible to blocking phenomenon. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention and the advantages thereof, reference is now made to the following descriptions taken in conjunction with the accompanying drawings in which like numbers designate like parts, and in which.

DETAILED DESCRIPTION

Figure 1:
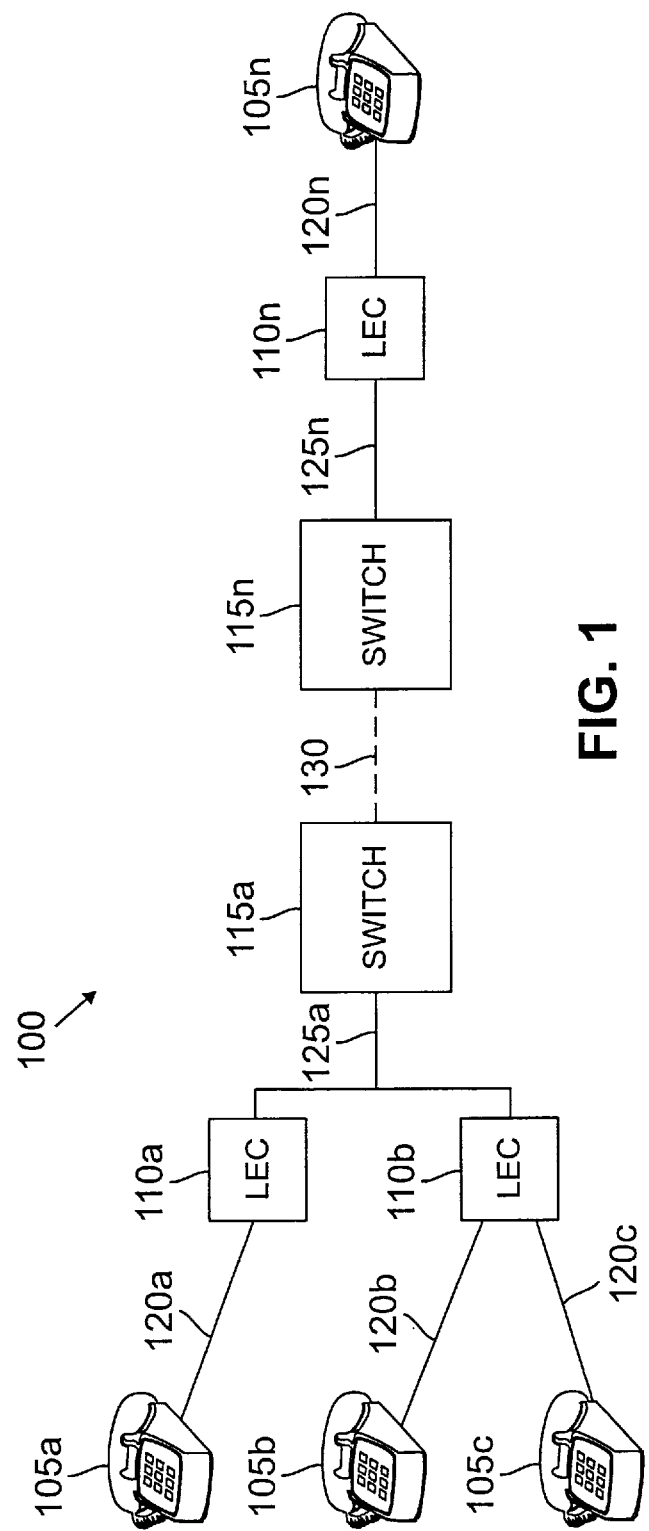
FIG. 1 illustrates a high-level block diagram of an exemplary communication network.

Referring initially to FIG. 1, illustrated is a high-level block diagram of an exemplary communication network (generally designated 100). Communication network 100 is suitably operative to process signals. It should be noted that although the principles of the present invention are disclosed in the context of a communication network, application of the invention is not so limited. The principles of the present invention may suitably be implemented or applied to transportation, emergency response or other networks susceptible to blocking phenomenon.

A "signal," as the term is used herein, includes any data packet, data frame, message, sequence of data or any other variation of a physical quantity that may be used to convey information, such as voice or non-voice data, for example. "Include," as the term is used herein, is defined as inclusion without limitation. "Or," as the term is used herein, is inclusive, meaning and/or.

Communication network 100 illustratively includes a plurality of network elements, namely, several conventional telephone stations 105a, 105b, 105c and 105n, several exemplary local exchange carriers ("LEC") 110a, 110b and 110n, and two exemplary switches 115a and 115n. The network elements are respectively interconnected by a plurality of conventional communication links, namely, 120a, 120b, 120c, 120n, 125a, 125b, 125n and 130.

Although only three switches 115 are shown, a calling signal transmitted through network 100 may traverse other switches 115, as well as additional network elements for that matter. "Network elements," as the phrase is used herein, includes, in addition to the network elements defined hereinabove (e.g., telephone stations 105, LECs 110 and switches 115), gateways, bridges, routers, portal devices, network nodes and the like, all of which are known. A "network node," as the phrase is used herein, includes any junction, end or connection point, apparatus, station, terminal or similar device, whether portable or not, that is capable of communicating signals, data or information in a communication network or system.

As summarized hereinabove, the principles of the present invention may suitably be incorporated into many signal processing applications. One advantageous embodiment estimates a blocking probability that is associated with a model of a communications network, such as a model of communication network 100, for example. "Associated with," as the phrase is used herein, means to include within, interconnect with, contain, be contained within, connect to, couple with, be communicable with, juxtapose, cooperate with, interleave, be a property of, or the like. The modeling embodiment may suitably use the estimated generalized blocking probability to evaluate at least a portion of the model of communication network 100, such as switch 115a, for example, to modify at least one parameter of the model. The parameter may advantageously represent some physical aspect of communication network 100 or possibly switch 115a. An important aspect of this embodiment is that the modeling system obeys certain specified conditions, whose behavior is used to understand one or more physical aspects of communication network 100. This embodiment is discussed in greater detail with reference to FIG. 3.

In an alternate advantageous embodiment, each of switches 115 may be a conventional suitably arranged switch, such as an "intelligent switch," a switch that is associated with processing circuitry that may suitably be implemented, programmed or fabricated to perform any of a plurality functions or operations within a communication network. An exemplary system in accordance with the principles of the present invention may suitably be implemented within switch 115a, for example. The system is operative to estimate a generalized blocking probability associated with at least switch 115a and to use the same to control routing of signals within communication network 100. An important aspect of this embodiment is that switch 115a, and more generally, communication network 100, may suitably modify, adjust, alter, or the like the communication/transmission paths of signals communicated/transmitted to at least switch 115a as a function of the estimated blocking probability. An exemplary embodiment of the same is discussed in greater detail with reference to FIG. 4.

Figure 2:
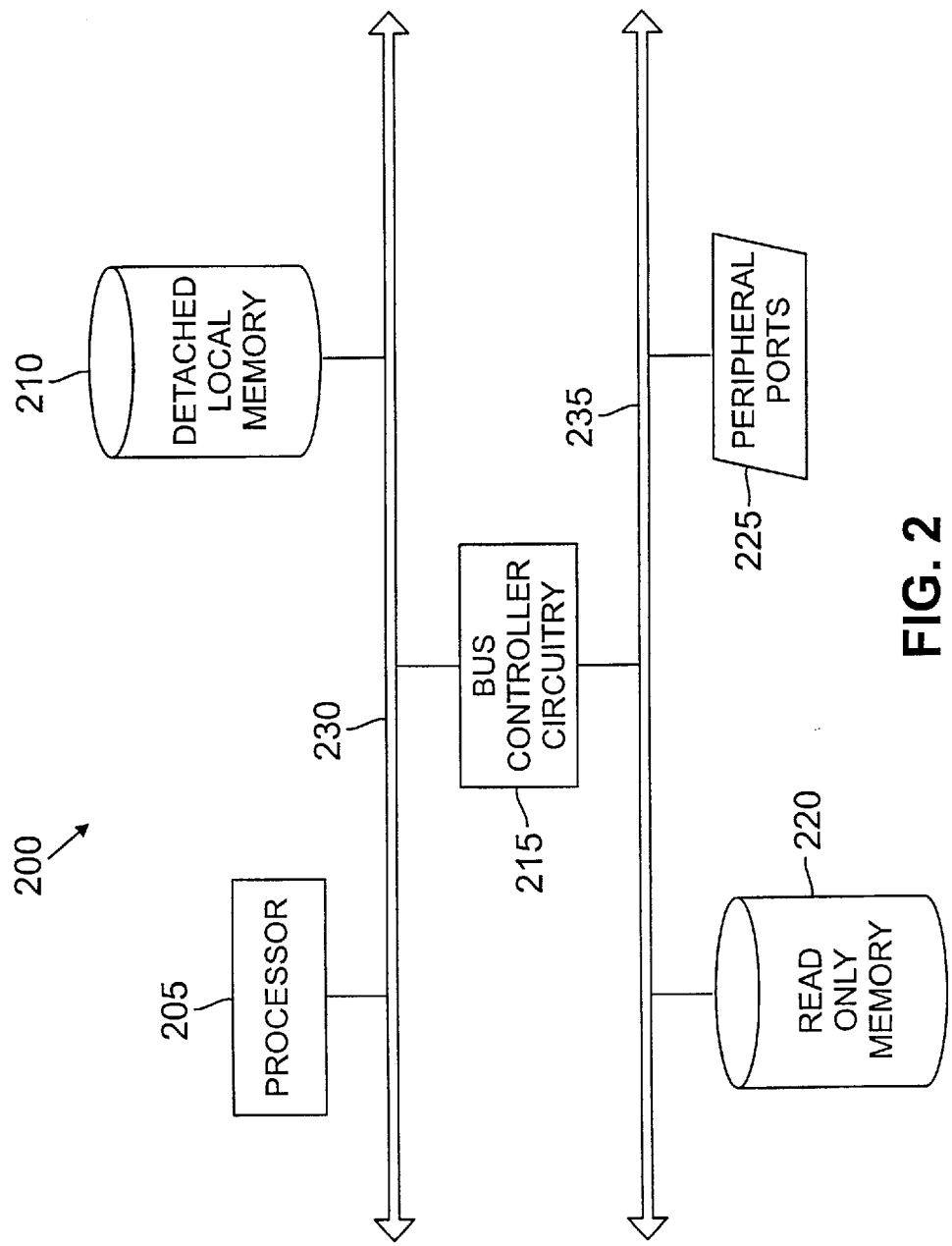
FIG. 2 illustrates a high-level block diagram of an exemplary microprocessing circuit that may suitably be associated with a conventional processing system.

Turning to FIG. 2, illustrated is a high-level block diagram of an exemplary microprocessing circuit (generally designated 200) that may suitably be associated with a conventional processing system, such as, at least in part, a personal computer or a conventional switch, as examples. Microprocessing circuit 200 illustratively includes a processor 205, a detached local memory 210, bus controller circuitry 215, a conventional read-only memory ("ROM") 220 and a set of peripheral ports 225. An exemplary host bus 230 is shown and is suitably operative to associate processor 205, detached local memory 210 and bus controller circuitry 215. In accordance with the illustrated embodiment, detached local memory 210 may suitably include conventional random access memory ("RAM"), and processor 205 may suitably be one or more cooperative processors.

An exemplary input/output ("I/O") bus 235 is shown and is operative to associate bus controller circuitry 215, ROM 220 and the set of peripheral ports 225. The set of peripheral ports 225 may suitably couple I/O bus 235 to any one or more of a plurality of conventional suitably arranged peripheral devices for communication therewith. Included among the set of peripheral ports 225 may suitably be one or more serial or parallel ports. Bus controller circuitry 215 provides suitable means by which host bus 230 and I/O bus 235 may be associated, thereby providing a path and management for communication therebetween. Each of the illustrated buses 230 and 235 requires a drive current to carry signals thereon. The illustrative circuit accordingly operates in conjunction with a conventional system controller (not shown) that supplies the required drive current. Of course, the illustrative circuit may also suitably be implemented having only a single bus.

In alternate preferred embodiments, microprocessing circuit 200, in whole or in part, may be replaced by, or combined with, any other suitable processing circuitry, including programmable logic devices, such as programmable array logic ("PALs") and programmable logic arrays ("PLAs"), digital signal processors ("DSPs"), field programmable gate arrays ("FPGAs"), application specific integrated circuits ("ASICs"), very large scale integrated circuits ("VLSIs") or the like, to form the various types of circuitry described and claimed herein.

Conventional processing system architecture is more fully discussed in *Computer Organization and Architecture*, by William Stallings, MacMillan Publishing Co. (3rd ed. 1993); conventional processing system network design is more fully discussed in *Data Network Design*, by Darren L. Spohn, McGraw-Hill, Inc. (1993); and conventional data communications is more fully discussed in *Data Communications Principles*, by R. D. Gitlin, J. F. Hayes and S. B. Weinstein, Plenum Press (1992) and in *The Irwin Handbook of Telecommunications*, by James Harry Green, Irwin Professional Publishing (2nd ed. 1992). Each of the foregoing publications is incorporated herein by reference for all purposes.

Figure 3:
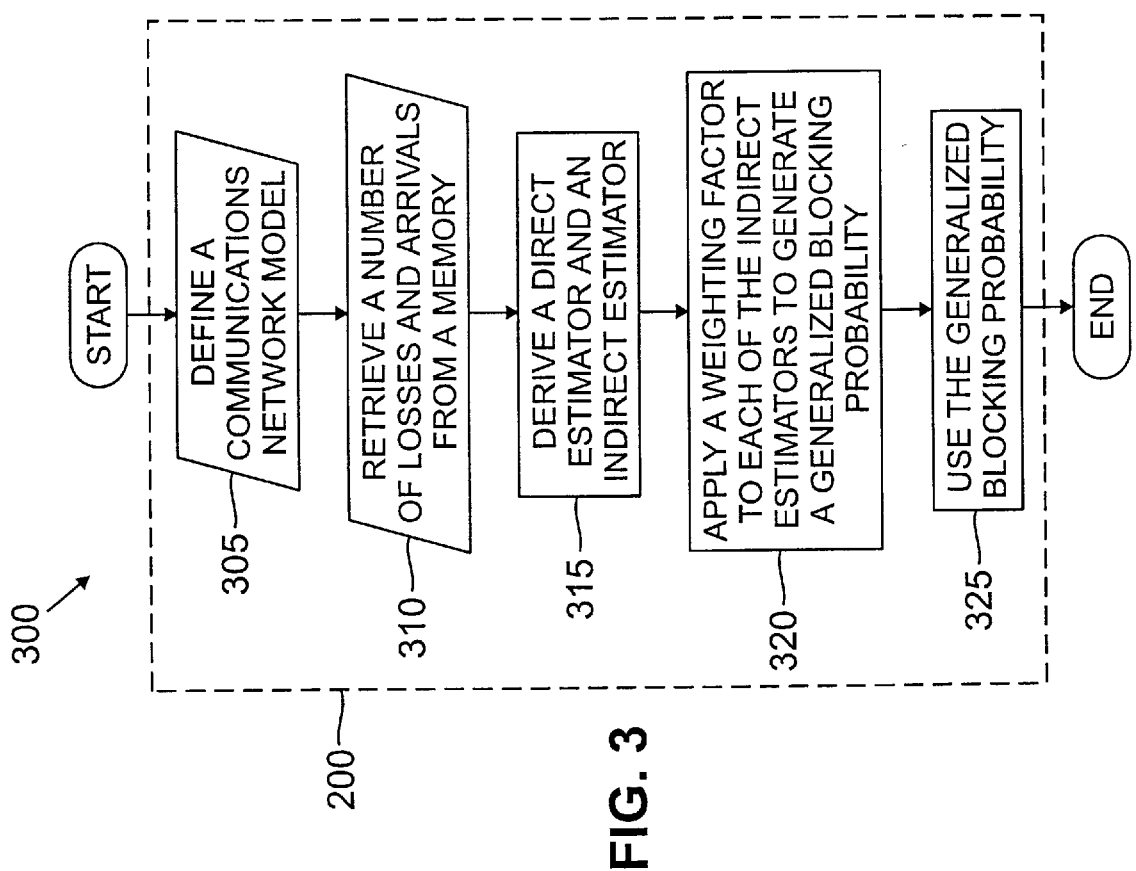
FIG. 3 illustrates a flow diagram of a method of operation of a modeling system according to the present invention for estimating a blocking probability associated with at least a portion of a model of a communication network, such as the communication network of FIG. 1.

Turning to FIG. 3, illustrated is an exemplary flow diagram of a method of operation of a modeling system (generally designated 300) for estimating a blocking probability of at least a portion of a model of a communication network, such as switch 115 of communication network 100, for example. The estimated blocking probability represents a likelihood that a signal transmitted to communication network 100, and more specifically, switch 115, from some other network element within network 100 will arrive at least at switch 115.

An advantageous embodiment for using or distributing the present invention is as software. The software embodiment is storable in conventional storage media (e.g., magnetic, optic, electric, or suitably arranged combinations thereof), readable from the same, and executable by one or more conventional processors. The software, upon execution, directs the processor to estimate a blocking probability associated with at least a portion of a model of a network, or a portion of an actual network, in accordance with the principles of the present invention.

An advantageous source code embodiment is attached hereto as an APPENDIX and is incorporated herein by reference for all purposes. The source code is written in CSIM programming language and is particularly useful for estimating blocking probabilities in simulations of stochastic loss models of communication networks. Referring to FIG. 2 for illustrative purposes, the source code may suitably be compiled and stored as object code in at least one of local memory 210 or ROM 220. Processor 205 may suitably be operative to selectively retrieve and execute the object code to derive blocking probabilities.

Stochastic loss models have one or more arrival processes modeled as a stochastic process, and have the property that not all arrivals are admitted. Arrivals that are not admitted are blocked. Exemplary process 300 estimates a probability that one or more arrivals will be blocked over a given run length. Suitable models may be complex loss models, as well as resource sharing models, for example, such as those including alternative routing. As discussed hereinabove in the Background of the Invention, conventional modeling approaches typically require substantial amounts of time to estimate acceptably accurate blocking probabilities.

The exemplary process of the illustrated embodiment provides a low-variance blocking probability estimate for a comparatively-shorter run length (or a shorter-run length for a given variance). This is particularly useful when hold times for arrivals are variable and blocking probabilities are relatively high, which is germane in communication networks where multiple services (e.g., voice and data lines) often lead to highly variable hold times and interest in response failures leads to considering scenarios with relatively high blocking probabilities.

According to the illustrated embodiment, a user defines (i.e., models) a communication network (process step 305). The communication network includes a plurality of interconnected network elements. The user, possibly through a suitably arranged graphical user interface (or "GUI"), enters or selects parameters, types, models or the like for at lest some of the network elements, and possibly for the communication network as a whole. Each parameter represents one or more physical aspects of the network elements.

A variety of conventional techniques for defining a communication network model are known, and further details for defining the same are not discussed. It should be noted that while the illustrated embodiment is a communication network model, alternate network models may represent transportation, emergency response, as well as other types of networks susceptible to blocking phenomenon.

The system retrieves a number of losses, L(t), and a number of arrivals (or attempts), A(t), from a memory, such as detached local memory 210 (input/output step 310). The number of losses and arrivals illustratively occur with respect to at least the portion of the communication network (e.g., switch 115) during a given period of time [0, t]. The number of losses and arrivals may be generated by simulation, statistical process, or other like manner or, alternatively, may be known. The number of losses and arrivals may then be stored in memory, or temporarily in a local or global variable.

A variety of conventional techniques for simulating or processing transmitted signals are known, and further details for generating losses and arrivals are also not discussed.

The system derives both a direct estimator and an indirect estimator (process step 315). The direct, or natural, estimator, $\hat{B}_N(t)$, is derived as a function of the retrieved number of losses and arrivals, namely, $$\hat{B}_N(t)=L(t)/A(t),$$

wherein L(t) represents the number of losses and A(t) represents the number of arrivals during the time period [0, t]. The direct estimator may therefore be derived as a ratio of a first quantity of a plurality of signals transmitted to at least a portion (e.g.,switch 115) of the communication network model that are blocked (or do not arrive), to a second quantity of the plurality of signals transmitted to at least the portion that arrive during a period of time, or observation interval, [0, t].

The indirect estimator, $\hat{B}_I(t)$, is given by:

$$\hat{B}_I(t) = 1 - \frac{\hat{n}(t)}{\alpha},$$

wherein $\hat{n}(t)$ represents an average number of users of the communication network over the period of time [0, t], namely, $$\hat{n}(t) = t^{-1}\int_0^t N(u)du,$$

wherein N(u) is the number of users of the network, or present in the designated system, at time, t; and α represents an offered load with respect to at least the portion of the communication network model (e.g., to switch 115) during the time period [0,t].

The indirect estimator, $\hat{B}(t)$, is therefore derived, in part, as a function of the quantity of users of the network (i.e., the number of parties or other systems transmitting signals to at least the portion of the network, such as switch 115), and the offered load, α, during the time period.

In an advantageous embodiment the offered load may suitably be represented as, $$\alpha=\lambda/\mu,$$

λ is an arrival rate and $\mu^{-1}$ is an average holding time, each of which may known or, alternatively, determined or generated by simulation, statistical process, or other like manner. Each of the arrival rate and average holding time may be stored in memory, or temporarily in a local or global variable. "Arrival rate," as the phrase is used herein, may be defined as the mean or average number of signals received by at least the portion of the network per a unit time. "Average holding time," as the phrase is used herein, may suitably be defined as one of the mean period of time that a transmitted signal waits before it is dropped, the mean period of time that a transmitted signal waits before it is received, the mean period of time that a signal remains in transmission and within the network, or the mean period of time that a trunk or circuit is in use on a transmitted signal, possibly including an operator's or the system's time in connecting the transmitted signal, subscriber's, caller's, operator's or called party's conversation time, or the like. According to the illustrated embodiment, it is preferable that the arrival rate and average holding time are well chosen or known, as is typically so in simulations.

The indirect estimator may suitably be derived from Little's Law (L=λW): if n is the steady-state mean of N(t) and B is the steady-state blocking probability, then the relation L=λW applied to the system yields $\lambda(1-B)\mu^{-1}$=n or, equivalently, B=1−(n/α).

In alternate embodiments, if there is a finite waiting room, it should be noted that the indirect estimator may suitably be applied in at least two ways. First, the system may suitably be regarded as a server having a waiting room. Then $\mu^{-1}$ represents the holding time within the system—the time spent waiting and in service, wherein N(t) is the number of users in the system, again either waiting or in service. Second, the system may suitably be regarded as the servers only, then $\mu^{-1}$ is the average time spent in service, not counting waiting, wherein N(t) is the number of users in service at time t. Little's Law and $\hat{B}_I(t)$ apply in both cases.

Returning to the illustrated embodiment, the exemplary system uses a combined estimator, $\hat{B}_C(t)$, by applying a weighting factor to the direct and indirect estimators to derive the blocking probability, $$\hat{B}_C(t)=p\hat{B}_N(t)+(1-p)\hat{B}_I(t),$$

wherein the weighting factor is appropriately chosen to reduce variance (processing step 320), i.e., the weighting factor may suitably be chosen to minimize the variance of the combined estimates. In this context, the weighting factor is p. The idea behind this method is an observation that $\hat{B}_I(t)$ typically decreases in $\hat{n}(t)$, while $\hat{B}_N(t)$ typically increases in $\hat{n}(t)$, so that $\hat{B}_I(t)$ and $\hat{B}_N(t)$ may suitably be negatively correlated.

It should be further noted, that for known variances, var $\hat{B}_N(t)$ and var $\hat{B}_I(t)$, and covariances, cov ($\hat{B}_I(t)$, $\hat{B}_N(t)$), the best p may suitably be $$p = \frac{\text{Var}\hat{B}_N(t) - \text{Cov}(\hat{B}_I(t),\hat{B}_N(t))}{\text{Var}\hat{B}_N(t) - 2\text{Cov}(\hat{B}_I(t),\hat{B}_N(t)) + \text{Var}\hat{B}_I(t)},$$

thereby yielding $0<p<1$, provided that Cov $(\hat{B}_I(t), \hat{B}_N(t))$ is negative, as is typically the case.

Since these variances and covariances are not known, the same are estimated from data. Preferably, the observations of $\hat{B}_I(t)$ and $\hat{B}_N(t)$ are divided into n batches (e.g., n=20), i.e., the total observation interval [0, t] is divided into n subintervals $$\left[ \frac{t}{n}(k-1), \frac{t}{n}k \right]$$

for $1 \leq k \leq n$.

Let $X_k$ be an estimate of $\hat{B}_N(t)$ using the $k^{th}$ subinterval; let $Y_k$ be our estimate of $\hat{B}_I(t)$ over the $k^{th}$ subinterval. Then estimate cov $(\hat{B}_N(t),\hat{B}_N(t))$, by $$\hat{C}(X,Y) = \frac{1}{n-1} \sum_{i=1}^{n} (X_i - \bar{X})(Y_i - \bar{Y})$$

where $$\bar{X} = \frac{1}{n} \sum_{i=1}^{n} X_i \quad \bar{Y} = \frac{1}{n} \sum_{i=1}^{n} Y_i.$$

And estimate Var $\hat{B}_N(t)$ by $$\hat{V}(X) = \frac{1}{n-1} \sum_{i=1}^{n} (X_i - \bar{X})^2.$$

And estimate Var $\hat{B}_I(t)$ by $$\hat{V}(Y) = \frac{1}{n-1} \sum_{i=1}^{n} (Y_i - \bar{Y})^2.$$

Then estimate p by $$\hat{p} = \frac{\hat{V}(X) - \hat{C}(X,Y)}{\hat{V}(X) - 2\hat{C}(X,Y) + \hat{V}(Y)}.$$

The system uses the generalized blocking probability to at least one of evaluate at least the portion of the communications network or modify at least one parameter of the model, wherein the parameter represents some physical aspect of the communications network (processing step 325). An important aspect of the illustrated embodiment is a low variance for a simulation run length, or, conversely, a typically short simulation run length for a given variance.

It should be noted further that the exemplary model may suitably include one or more arrival processes for transmitting signals to the communication network and may be modeled as one or more stochastic processes, wherein ones of the transmitted signals have the property that not all of the same arrive or are admitted. The exemplary model may suitably be a complex loss network, resource-sharing model, possibly with alternative routing, or the like, for example.

Figure 4:
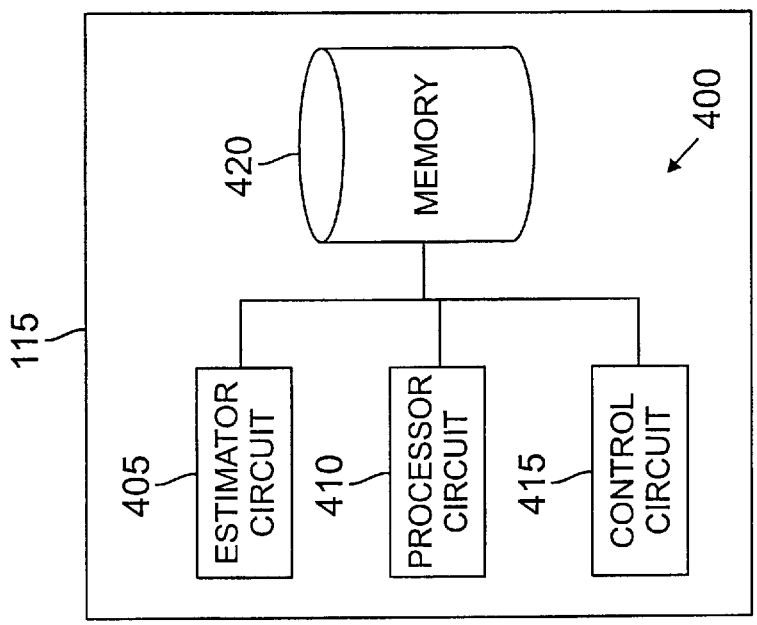
FIG. 4 illustrates a high-level block diagram of a system according to the present invention for estimating a blocking probability associated with at least a portion of a communication network.

Turning to FIG. 4, illustrated is a high-level block diagram of a system (generally designated 400) for estimating a generalized blocking probability associated with at least a portion of a communications network, again, such as switch 115 of communications network 100, for example.

Exemplary system 400 is illustratively associated with switch 115 and suitably includes an estimator circuit 405, a processing circuit 410 and a routing control circuit 415. Estimator circuit 405 is operative to derive each of a direct estimator and an indirect estimator according to the present invention. The direct estimator is derived as a function of a number of losses and arrivals occurring with respect to at least switch 115 during a particular period of time. In an advantageous embodiment, estimator circuit 405 uses a ratio of a first quantity of signals transmitted to at least switch 115 that are blocked to a second quantity of signals transmitted to at least switch 115 that arrive during the time period.

Estimator circuit 405 derives the indirect estimator as a function of an offered load with respect to at least switch 115 during the period of time. In an advantageous embodiment, system 400 includes a memory 420 that stores an arrival rate, $\lambda$, and an average holding time, $\mu^{-1}$. Estimator circuit 405 is operative to retrieve the arrival rate and average holding time from memory 420 and use the same to derive the offered load, at least in part, as a function thereof.

The arrival rate and average holding time may suitably be determined statistically or through some other known manner that accurately reflects properties of the same. Recall that the arrival rate is the mean or average number of signals received by at least switch 115 per unit time, and the average holding time, N(t), is one of the mean period of time that a transmitted signal waits before it is dropped, the mean period of time that a transmitted signal waits before it is received, the mean period of time that a signal remains in transmission and within a communication network, or the mean period of time that a trunk or circuit is in use on a transmitted signal, possibly including an operator's or the system's time in connecting the transmitted signal, subscriber's, caller's, operator's or called party's conversation time, or the like.

Estimator circuit 405 is further operative to derive the indirect estimator as a function of m(t), a quantity of users of the communication network during the time period. Recall that the quantity of users of the communication network is the number of parties or other systems transmitting signals to the communications network or, possibly, a portion of the same, such as switch 115.

Processing circuit 410 is operative to apply a weighting factor to the direct and indirect estimators to derive the blocking probability. The weighting factor minimizes the variance of the combined estimates. Processing circuit 405 uses the blocking probability to one of evaluate at least switch 115 or to modify at least one parameter of the communication network, such as switch 115, for example. Routing control circuit 415, which is responsive to processing circuit 410 and, more particularly, the derived generalized blocking probability, controls the routing of current or subsequently received signals within the communication network. The routing control is a function of the derived generalized blocking probability, and according to the illustrated embodiment, may suitably be used to route received signals to or away from switch 115 in an effort to reduce utilization of at least switch 115's signal processing resources.

Although the present invention has been described in detail, those skilled in the art should understand that they can make various changes, substitutions and alterations herein without departing from the spirit and scope of the invention in its broadest form. The principles of the present invention may therefore be implemented in or used in conjunction with any suitable network or model of the same, including processing system networks, telephony systems (e.g., sound, video, data, etc.), message paging systems, transportation systems, emergency response systems, or other like networks susceptible to blocking phenomenon.

APPENDIX

```c
#include <assert.h>
#include <math.h>
#include "csim.h"
#define DEBUG 0

FACILITY q;
int ntrunks, nbatches, number_busy, flag1, ndeps;
double service_time;
double arr_rate, dep_rate, arr_scv, sim_time, transient_time, weighted_time,
oldclock, congestion_time, dep_scv, arr_variance, dep_variance, p,
begin_clock, m_h, m_l, l_h, l_l, next_event_time;
FILE *outfile;
STREAM st;
EVENT ev;
sim (int argc, char *argv[])
{
int I, ncompleted, j, init_num_busy, count;
double newest_var, x, simple[20], natural[20], indirect [20],
        svar, nvar, ivar, smean, imean, nmean, cvar, cmean, congestion[20],
        init_time, combo[20], comean, covar, arr_mean, hold_time,
        covarexact, comeanexact, opt_p, indsimcov, est_p, dep_mean,
        ndepartures[20], arrsimcov, arrindcov, depsimcov, depindcov,
        narrivals[20], arr_var, dep_var, a1, a2, indnatcov, depnatcov,
        arrnatcov, newind[20], nimean, nivar, newnatcov, newsimcov,
        newarrcov, newdepcov, newest, meanocc_mean, meanocc[20],
        intensity[20], intensity_mean, intensity_var, meanocc_var;
long seed, result;
max_servers (11000);
max_processes (50000);
if (argc != 2) printf("Usage: /usr/srikant/csim/loss Output_File_Name\n");
else {
create ("sim");
outfile=fopen (argv[1], "w");
printf("Enter Random Number Seed: ");
scanf("%d", &seed);
fprintf(outfile, "Enter Random Number Seed: %d\n", seed);
printf("Enter Capacity (s): ");
scanf("%d", &ntrunks);
fprintf(outfile, "Enter Capacity (s): %d\n", ntrunks);
assert(ntrunks > 0);
printf("Enter Initial Number of Busy Trunks: ");
scanf("%d", &init_num_busy);
fprintf(outfile, "Enter Initial Number of Busy Trunks: %d\n", init_num_busy);
printf("Enter 1 if MMPP or 0 else: ");
scanf("%d", &flag1);
fprintf(outfile, "Enter 1 if MMPP or 0 else: %d\n", flag1);
if (flag1 == 0) {
printf("Enter Arrival Rate (Lambda): ");
scanf("%lf", &arr_rate);
fprintf(outfile, "Enter Arrival Rate (Lambda): %lf\n", arr_rate);
```

-31-

```
            printf("Enter Arrival SCV : ");
            scanf("%lf", &arr_scv);
            fprintf(outfile, "Enter Arrival SCV : %lf\n", arr_scv);
            }
 5          else {
            printf("Enter m_h: ");
            scanf("%lf", &m_h);
            fprintf(outfile, "Enter m_h: %lf\n", m_h);
            printf("Enter m_l: ");
10          scanf("%lf", &m_l);
            fprintf(outfile, "Enter m_l: %lf\n", m_l);
            printf("Enter lambda_h: ");
            scanf("%lf", &l_h);
            fprintf(outfile, "Enter lambda_h: %lf\n", l_h);
15          printf("Enter lambda_l: ");
            scanf("%lf", &l_l);
            fprintf(outfile, "Enter lambda_l: %lf\n", l_l);
            }
            printf("Enter Departure Rate (Mu): ");
20          scanf("%lf", &dep_rate);
            fprintf(outfile, "Enter Departure Rate (Mu): %lf\n", dep_rate);
            printf("Enter Departure SCV : ");
            scanf("%lf", &dep_scv);
            fprintf(outfile, "Enter Departure SCV : %lf\n", dep_scv);
25          printf("Enter Number of Batches (<= 20) : ");
            scanf("%d", &nbatches);
            assert(nbatches < 21);
            fprintf(outfile, "Enter Number of Batches (<= 20) : %d\n", nbatches);
            printf("Enter Steady State Simulation Time: ");
30          scanf("%lf", &sim_time);
            fprintf(outfile, "Enter Steady State Simulation Time: %lf\n", sim_time);
            printf("Enter Transient Time: ");
            scanf("%lf", &transient_time);
            fprintf(outfile, "Enter Transient Time: %lf\n\n", transient_time);
35          /*printf("Enter p (weight on simple estimator): ");
            scanf("%lf", &p);
            fprintf(outfile, "Enter p (weight on simple estimator): %lf\n", p);*/
            reset_prob (seed);
            ev=event ("name");
40          if (l_h == 0) l_h=1.0/ (2* (sim_time+transient_time));
            if (l_l == 0) l_l=1.0/ (2* (sim_time+transient_time));
            if (ntrunks != 1) q=facility_ms ("multi srvr", ntrunks);
            if (ntrunks == 1) q=facility ("sngle srvr");
            sim_time=sim_time/nbatches;
45          if (flag1 != 0) arr_rate=(m_h*l_h+m_l*l_l)/(m_h+m_l);
            arr_variance=arr_scv* (1.0/arr_rate)*(1.0/arr_rate);
            dep_variance=dep_scv* (1.0/dep_rate)*(1.0/dep_rate);

/* Do if Markov Modulated Poisson Process Arrivals (MMPP) */
50          if (flag1 != 0) mmpp ();

/* Loading Link with Inital Number of Busy Servers */
```

-32-

```
        number_busy=0;
        while (number_busy < init_num_busy) {
              if (number_busy < ntrunks) {
                      number_busy=number_busy+1;
 5                    customer();
              }
              if (flag1 == 0) {
              if (arr_scv > 1.0) hold(hyperx(1.0/(ntrunks*10000), arr_variance));
              if (arr_scv == 1.0) hold(expntl(1.0/(ntrunks*10000)));
10            if (arr_scv < 1.0) hold(erlang(1.0/(ntrunks*10000), arr_variance));
              }
              else {
              if (arr_scv == 1.0) hold(expntl(1.0/(ntrunks*10000)));
              }
15      }
        init_time=clock;
        if (DEBUG) printf("init_time=%lf\n", init_time);
        if (DEBUG) fprintf(outfile, "init_time=%lf\n", init_time);
        fflush (outfile);
20      reset ();

/* Transients */ while (clock < init_time+transient_time) {
25            if (number_busy < ntrunks) {
                  number_busy=number_busy+1;
                  customer ();
              }
              if (flag1 == 0) {
30            if (arr_scv > 1.0) hold(hyperx(1.0/arr_rate, arr_variance));
              if (arr_scv == 1.0) hold(expntl(1.0/arr_rate));
              if (arr_scv < 1.0) hold(erlang(1.0/arr_rate, arr_variance));
              }
              else{
35                wait (ev);
              }
        }
        if (DEBUG) printf("clock=%lf\n", clock);
        if (DEBUG) fprintf(outfile, "clock=%lf\n", clock);
40      fflush (outfile);
        reset ();

/* Steady State Simulation */

45      for (I=0; I < nbatches; I++) {
        printf("Begin Batch %d\n", I);
        narrivals[i]=0;
        service_time=0;
        ndeps=0;
50      ncompleted=0;
        if (DEBUG) printf("clock=%lf\n", clock);
        if (DEBUG) fprintf(outfile, "clock=%lf\n", clock);
```

-33-

```
        fflush (outfile);
        oldclock=clock;
        begin_clock=clock;
        weighted_time=0.0;
5       congestion_time=0.0;
        while (clock < init_time+transient_time+(I+1)*sim_time) {
               narrivals[i]=narrivals[i]+1;
        if (0) fprintf(outfile, "narrivals=%d\n", narrivals[i]);
        if (0) fprintf(outfile, "number_busy=%d\n", number_busy);
10      fflush (outfile);
               if (number_busy < ntrunks) {
                      weighted_time=weighted_time+(clock-oldclock)*number_busy;
                      oldclock=clock;
                      number_busy=number_busy+1;
15                    customer ();
                      ncompleted=ncompleted+1;
                      if (0) fprintf(outfile, "ncompleted=%d\n", ncompleted);
               }
               if (flag1 ==0) {
20             if (arr_scv > 1.0) hold(hyperx(1.0/arr_rate, arr_variance));
               if (arr_scv == 1.0) hold(expntl(1.0/arr_rate));
               if (arr_scv < 1.0) hold(erlang(1.0/arr_rate, arr_variance));
               }
               else {
25                    wait (ev);
               }
               assert (ncompleted < narrivals[i]+1);
               }
        weighted_time=weighted_time+(clock-oldclock)*number_busy;
30      ndepartures[i]=ndeps/service_time;
        if (0) fprintf(outfile, "Weighted Time=%lf\n", weighted_time);
        x=1.0*ncompleted/(narrivals[i]);
        natural[i]=1-x;
        if (DEBUG) printf("Natural Blocking=%lf\n", natural[i]);
35      x=narrivals[i]-ncompleted;
        simple[i]=x;
        if (DEBUG) printf("Lost Calls=%lf\n", x);
        simple[i]=x/ (arr_rate* (clock-begin_clock));
        if (DEBUG) printf("Simple Blocking=%lf\n", x);
40      indirect[i]=weighted_time/(clock-begin_clock);
        meanocc[i]=indirect[i];
        if (DEBUG) printf("Mean Occupancy=%lf\n", indirect[i]);
        narrivals[i]=narrivals[i]/sim_time;
        newind[i]=indirect[i]/(narrivals[i]/(1.0/dep_rate));
45      if (0){
               printf("Estimated Arr Rate= %lf, Dep rate= %lf \n\n",
                      narrivals[i], ndepartures[i]);
               printf("Estimated Traffic Erlangs= %lf\n\n",
                      narrivals[i]/ndepartures[i]);
50             fprintf(outfile, "Estimated Arr Rate= %lf, Dep rate= %lf \n\n",
                      narrivals[i], ndepartures[i]);
               fprintf(outfile, "Estimated Traffic Erlangs= %lf\n\n",
```

-34-

```
                narrivals[i]/ndepartures[i]);
        }
        intensity[i]=(1.0*narrivals[i]/ndepartures[i]);
        indirect[i]=indirect[i]/(1.0*arr_rate/dep_rate);
  5     indirect[i]=1.0-indirect[i];
        newind[i]=1.0-newind[i];
        if (DEBUG) printf("Indirect Blocking=%lf\n", indirect[i]);
        congestion[i]=congestion_time/(clock-begin_clock);
        if (DEBUG) printf("Time Congestion Blocking=%lf\n", congestion[i]);
 10     if (DEBUG) printf("clock=%lf\n", clock);
        reset ();
        }

/*  Stop MMPP Arrivals */
 15     flag1=0;

/* Output */
        smean=0.0;
        imean=0.0;
 20     nmean=0.0;
        cmean=0.0;
        nimean=0.0;
        arr_mean=0.0;
        dep_mean=0;
 25     meanocc_mean=0.0;
        intensity_mean=0.0;
        for (I=0; I < nbatches; I++) {
        smean=smean+(1.0/nbatches)*simple[i];
                nimean=nimean+(1.0/nbatches)*newind[i];
 30             imean=imean+(1.0/nbatches)*indirect[i];
                nmean=nmean+(1.0/nbatches)*natural[i];
                cmean=cmean+(1.0/nbatches)*congestion[i];
                arr_mean=arr_mean+(1.0/nbatches)*narrivals[i];
                dep_mean=dep_mean+(1.0/nbatches)*ndepartures[i];
 35             meanocc_mean=meanocc_mean+(1.0/nbatches)*meanocc[i];
                intensity_mean=intensity_mean+(1.0/nbatches)*intensity[i];
        }
        newest=1-(meanocc_mean/(arr_mean/dep_mean));
        svar=0.0;
 40     ivar=0.0;
        nvar=0.0;
        cvar=0.0;
        intensity_var=0.0;
        meanocc_var=0.0;
 45     nivar=0.0;
        indsimcov=0.0;
        indnatcov=0.0;
        arrsimcov=0.0;
        arrnatcov=0.0;
 50     arrindcov=0.0;
        depsimcov=0.0;
        depnatcov=0.0;
```

```
        depindcov=0.0;
        newnatcov=0.0;
        newsimcov=0.0;
        newarrcov=0.0;
5       newdepcov=0.0;
        arr_var=0.0;
        dep_var=0.0;
        if (nbatches > 1) {
        for (I=0; I < nbatches ; I++) {
10              svar=svar+(1.0/(nbatches-1))*(simple[i]-smean)*(simple[i]-smean);
                ivar=ivar+(1.0/(nbatches-1))*(indirect[i]-imean)*(indirect[i]-imean);
                nivar=nivar+(1.0/(nbatches-1))*(newind[i]-nimean)*(newind[i]-nimean);
        intensity__var=intensity__var+(1.0/(nbatches-1))*pow((intensity[i]-intensity
        mean),2.0);
15      meanocc_var=meanocc_var+(1.0/(nbatches-1))*pow((meanocc[i]-meanocc_mean),2.0);
        newsimcov=newsimcov+(1.0/(nbatches-1))*(newind[i]-nimean)*(simple[i]-smean);
        newnatcov=newnatcov+(1.0/(nbatches-1))*(newind[i]-nimean)*(natural[i]-nmean);
        indsimcov=indsimcov+(1.0/(nbatches-1))*(indirect[i]-imean)*(simple[i]-smean);
        indnatcov=indnatcov+(1.0/(nbatches-1))*(indirect[i]-imean)*(natural[i]-nmean);
20      arrsimcov=arrsimcov+(1.0/(nbatches-1))*(narrivals[i]-arr_mean)*(simple[i]-smean);
        arrnatcov=arrnatcov+(1.0/(nbatches-1))*(narrivals[i]-arr_mean)*(natural[i]-nmean);
        arrindcov=arrindcov+(1.0/(nbatches-1))*(narrivals[i]-arr_mean)*(indirect[i]-imean);
        depsimcov=depsimcov+(1.0/(nbatches-1))*(ndepartures[i]-dep_mean)*(simple[i]-smean);
        depnatcov=depnatcov+(1.0/(nbatches-1))*(ndepartures[i]-dep_mean)*(natural[i]-nmean);
25      depindcov=depindcov+(1.0/(nbatches-1))*(ndepartures[i]-dep__mean)*(indirect[i]-
        imean);
        newarrcov=newarrcov+(1.0/(nbatches-1))*(narrivals[i]-arr_mean)*(newind[i]-nimean);
        newdepcov=newdepcov+(1.0/(nbatches-1))*(ndepartures[i]-dep_mean)*(newind[i]-nimean);
        nvar=nvar+(1.0/(nbatches-1))*(natural[i]-nmean)*(natural[i]-nmean);
30      cvar=cvar+(1.0/(nbatches-1))*(congestion[i]-cmean)*(congestion[i]-cmean);
        arr_var=arr_var+(1.0/(nbatches-1))*(narrivals[i]-arr_mean)*(narrivals[i]-arr_mean);
        dep__var=dep__var+(1.0/(nbatches-1))*(ndepartures[i]-dep__mean)*(ndepartures[i]-
        dep_mean);
        }
35      newest_var=(meanocc_var/(intensity_mean*intensity_mean));
        newest_var=pow(1.0*newest_var/nbatches, 0.5);
                if (0) {
                printf("indsimcov=%lf depindcov=%lf arrindcov=%lf depnatcov=%lf
                depsimcov=%lf arrnatcov=%lf \n\narrsimcov=%lf arr_var=%lf
40              dep_var=%lf\n\n", indsimcov, depindcov,
                        arrindcov, depnatcov, depsimcov, arrnatcov, arrsimcov, arr_var, dep_var);
                fprintf(outfile, "indsimcov=%lf depindcov=%lf arrindcov=%lf depnatcov=%lf
                depsimcov=%lf arrnatcov=%lf \n\narrsimcov=%lf arr_var=%lf
                dep_var=%lf\n\n", indsimcov, depindcov,
45                      arrindcov, depnatcov, depsimcov, arrnatcov, arrsimcov, arr_var, dep_var);
                }
        comeanexact=imean;
        covarexact=ivar;
        est_p=(ivar-indsimcov)/(ivar+svar-2*indsimcov);
50      /*
        opt_p=1;
        for (j=0; j < 1001; j++) {
```

```
            p=j*1.0/1000;
    */
            p=est_p;
            comean=0.0;
            for (I=0; I < nbatches; I++) {
            combo[i]=p*simple[i]+(1-p)*indirect[i];
            comean=comean+(1.0/nbatches)*combo[i];
            }
            covar=0.0;
            for (I=0; I < nbatches; I++) {
            covar=covar+(1.0/(nbatches-1))*(combo[i]-comean)*(combo[i]-comean);
            }
            if (0) fprintf (outfile, "%lf %lf\n", p, covar);
            if (covar < covarexact) {
                covarexact=covar;
                comeanexact=comean;
                opt_p=p;
            }
    /*
            }
    */
            }
            printf("Congestion Estimate=%lf\n\n", cmean);
            fprintf(outfile, "Congestion Estimate=%lf\n\n", cmean);
            printf("Congestion Std. Dev.=%lf\n\n", pow(cvar*1.0/nbatches, 0.5));
            fprintf(outfile, "Congestion Std. Dev.=%lf\n\n", pow(cvar*1.0/nbatches, 0.5));
            printf("Natural Estimate=%lf\n\n", nmean);
            fprintf(outfile, "Natural Estimate=%lf\n\n", nmean);
            printf("Natural Std. Dev.=%lf\n\n", pow(nvar*1.0/nbatches, 0.5));
            fprintf(outfile, "Natural Std. Dev.=%lf\n\n", pow(nvar*1.0/nbatches, 0.5));
            printf("Simple Estimate=%lf\n\n", smean);
            fprintf(outfile, "Simple Estimate=%lf\n\n", smean);
            printf("Simple Std. Dev.=%lf\n\n", pow(1.0*svar/(nbatches), 0.5));
            fprintf(outfile, "Simple Std. Dev.=%lf\n\n", pow(1.0*svar/(nbatches), 0.5));
            printf("Indirect Estimate=%lf\n\n", imean);
            fprintf(outfile, "Indirect Estimate=%lf\n\n", imean);
            printf("Indirect Std. Dev.=%lf\n\n", pow(1.0*ivar/(nbatches), 0.5));
            fprintf(outfile, "Indirect Std. Dev.=%lf\n\n", pow(1.0*ivar/(nbatches), 0.5));
            printf("Mean Occupancy=%lf\n", meanocc_mean);
            fprintf(outfile, "Mean Occupancy=%lf\n", meanocc_mean);
            /*printf("Srikant-Ward Estimate=%lf\n\n", newest);
            fprintf(outfile, "Srikant-Ward Estimate=%lf\n\n", newest);
            printf("Srikant-Ward Indirect Std. Dev. (Error) =%lf\n\n", newest_var);
            fprintf(outfile, "Srikant-Ward Indirect Std. Dev. (Error) .=%lf\n\n", newest_var);*/
            printf("New Indirect Estimate=%lf\n\n", nimean);
            fprintf(outfile, "New Indirect Estimate=%lf\n\n", nimean);
            printf("New Indirect Std. Dev.=%lf\n\n", pow(1.0*nivar/(nbatches), 0.5));
            fprintf(outfile, "New Indirect Std. Dev.-%lf\n\n", pow(1.0*nivar/(nbatches), 0.5));
            printf("Estimated Optimal p (weight on simple estimator)=%lf\n\n", est_p);
            fprintf(outfile, "Estimated Optimal p (weight on simple estimator)=%lf\n\n", est_p);
            printf("Indirect + Simple Combo Estimate=%lf\n\n", comeanexact);
            fprintf(outfile, "Indirect + Simple Combo Estimate=%lf\n\n", comeanexact);
```

```
        printf("Indirect + Simple Combo Std. Dev.=%lf\n\n", pow(covarexact*1.0/nbatches,
        0.5));
        fprintf(outfile,   "Indirect  +  Simple  Combo  Std.  Dev.=%lf\n\n",  pow
        (covarexact*1.0/nbatches, 0.5));

p=(ivar-indnatcov)/(ivar+nvar-2*indnatcov);
            comean=0.0;
            for (I=0; I < nbatches; I++) {
            combo[i]=p*natural[i]+(1-p)*indirect[i];
            comean=comean+(1.0/nbatches)*combo[i];
            }
            covar=0.0;
            for (I=0; I < nbatches; I++) {
            covar=covar+(1.0/(nbatches-1))*(combo[i]-comean)*(combo[i]-comean);
            }
        printf("Indirect + Natural Combo Estimate=%lf\n\n", comean);
        fprintf(outfile, "Indirect + Natural Combo Estimate=%lf\n\n", comean);
        printf("Indirect + Natural Combo Std. Dev.=%lf\n\n", pow(covar*1.0/nbatches, 0.5));
        fprintf(outfile,   "Indirect  +  Natural  Combo  Std.  Dev.=%lf\n\n",
        pow(covar*1.0/nbatches, 0.5));

p=(nivar-newnatcov)/(nivar+nvar-2*newnatcov);
            comean=0.0;
            for (I=0; I < nbatches; I++) {
            combo[i]=p*natural[i]+(1-p)*newind[i];
            comean=comean+(1.0/nbatches)*combo[i];
            }
            covar=0.0;
            for (I=0; I < nbatches; I++) {
            covar=covar+(1.0/(nbatches-1))*(combo[i]-comean)*(combo[i]-comean);
            }
        printf("New Indirect + Natural Combo Estimate=%lf\n\n", comean);
        fprintf(outfile, "New Indirect + Natural Combo Estimate=%lf\n\n", comean);
        printf("New Indirect + Natural Combo Std. Dev.=%lf\n\n", pow(covar*1.0/nbatches,
        0.5));
        fprintf(outfile,   "New  Indirect  +  Natural  Combo  Std.  Dev.=%lf\n\n",  pow
        (covar*1.0/nbatches, 0.5));
        /* Indirect + Control Variate */ comean=0.0;
            a1=-1.0*arrindcov/arr_var;
            a2=-1.0*depindcov/dep_var;
            for (I=0; I < nbatches; I++) {
            combo[i]=indirect[i]+a1*(narrivals[i]-arr_rate)+a2*(ndepartures[i]-dep_rate);
            comean=comean+(1.0/nbatches)*combo[i];
            }
            covar=0.0;
            for (I=0; I < nbatches; I++) {
            covar=covar+(1.0/(nbatches-1))*(combo[i]-comean)*(combo[i]-comean);
            }
        printf("Control Variate + Indirect Estimate=%lf\n\n", comean);
        fprintf(outfile, "Control Variate + Indirect Estimate=%lf\n\n", comean);
```

```
        printf("Control Variate  Indirect Std. Dev.=%lf\n\n", pow(covar*1.0/nbatches,
        0.5));
        fprintf(outfile, "Control Variate + Indirect Std. Dev.=%lf\n\n", pow
        (covar*1.0/nbatches, 0.5));

/* SW + Control Variate */ comean=0.0;
        a1=-1.0*arrindcov/arr_var;
        a1=a1*(arr_rate/dep_rate)/(intensity_mean);
        a2=-1.0*depindcov/dep_var;
        a2=a2*(arr_rate/dep_rate)/intensity_mean;
        for (I=0; I < nbatches; I++) {
        combo[i]=meanocc[i]/intensity___mean+a1*(narrivals[i]-arr
        rate)+a2*(ndepartures[i]-dep_rate);
        combo[i]=1.0-combo[i];
        comean=comean+(1.0/nbatches)*combo[i];
        }
/*printf("Control Variate + SW Estimate=%lf\n\n", comean);
        fprintf(outfile, "Control Variate + SW Estimate=%lf\n\n", comean);*/

/* New Indirect + Control Variate */ comean=0.0;
        a1=-1.0*newarrcov/arr_var;
        a2=-1.0*newdepcov/dep_var;
        for (I=0; I < nbatches; I++) {
        combo[i]=newind[i]+a1*(narrivals[i]-arr_rate)+a2*(ndepartures[i]-dep_rate);
        comean=comean+(1.0/nbatches)*combo[i];
        }
        covar=0.0;
        for (I=0; I < nbatches; I++) {
        covar=covar+(1.0/(nbatches-1))*(combo[i]-comean)*(combo[i]-comean);
        }
/*printf("Control Variate + New Indirect Estimate=%lf\n\n", comean);
        fprintf(outfile, "Control Variate + New Indirect Estimate=%lf\n\n", comean);
        printf("Control Variate + New Indirect Std. Dev.=%lf\n\n", pow(covar*1.0/nbatches,
        0.5));
        fprintf(outfile, "Control Variate + New Indirect Std. Dev.=%lf\n\n", pow
        (covar*1.0/nbatches, 0.5));

/* Simple + Control Variate */ comean=0.0;
        a1=-1.0*arrsimcov/arr_var;
        a2=-1.0*depsimcov/dep_var;
        for (I=0; I < nbatches; I++) {
        combo[i]=simple[i]+a1*(narrivals[i]-arr_rate)+a2*(ndepartures[i]-dep_rate);
        comean=comean+(1.0/nbatches)*combo[i];
        }
        covar=0.0;
        for (I=0; I < nbatches; I++) {
```

```
        covar=covar+(1.0/(nbatches-1))*(combo[i]-comean)*(combo[i]-comean);
        }
printf("Control Variate + Simple Estimate=%lf\n\n", comean);
fprintf(outfile, "Control Variate + Simple Estimate=%lf\n\n", comean);
printf("Control Variate + Simple Std. Dev.=%lf\n\n", pow(covar*1.0/nbatches, 0.5));
fprintf(outfile, "Control Variate + Simple Std. Dev.=%lf\n\n",
pow(covar*1.0/nbatches, 0.5));

/* Natural + Control Variate */ comean=0.0;
        a1=-1.0*arrnatcov/arr_var;
        a2=-1.0*depnatcov/dep_var;
        for (I=0; I < nbatches; I++) {
        combo[i]=natural[i]+a1*(narrivals[i]-arr_rate)+a2*(ndepartures[i]-dep_rate);
        comean=comean+(1.0/nbatches)*combo[i];
        }
        covar=0.0;
        for (I=0; I < nbatches; I++) {
        covar=covar+(1.0/(nbatches-1))*(combo[i]-comean)*(combo[i]-comean);
        }
printf("Control Variate + Natural Estimate=%lf\n\n", comean);
fprintf(outfile, "Control Variate + Natural Estimate=%lf\n\n", comean);
printf("Control Variate + Natural Std. Dev.=%lf\n\n", pow(covar*1.0/nbatches, 0.5));
fprintf(outfile, "Control Variate + Natural Std. Dev.=%lf\n\n",
pow(covar*1.0/nbatches, 0.5));

printf("Average Arrival Rate=%lf\n\n", arr_mean);
fprintf(outfile, "Average Arrival Rate=%lf\n\n", arr_mean);
printf("Average Departure Rate=%lf\n\n", dep_mean);
fprintf(outfile, "Average Departure Rate=%lf\n\n", dep_mean);

/* Grand Combo */ opt_p=0.0;
covarexact=1000.0;
for (j=0; j <= 100; j++) {
        p=1.0*j/100;

a1=-1.0*(p*arrnatcov+(1-p)*arrindcov)/arr_var;
        a2=-1.0*(p*depnatcov+(1-p)*depindcov)/dep_var;

if (0) {
            printf("Estimated a1, a2, p for Grand Combo=%lf, %lf, %lf\n", a1, a2,p);
            fprintf(outfile, "Estimated a1, a2, p for Grand Combo=%lf, %lf, %\n",
a1,lf a2,p);
        }
        comean=0.0;
        for (I=0; I < nbatches; I++) {
        combo[i]=p*natural[i]+(1-p)*indirect[i]+a1*(narrivals[i]-arr
rate)+a2*(ndepartures[i]-dep_rate);
        comean=comean+(1.0/nbatches)*combo[i];
```

-40-

```
        }
        covar=0.0;
        for (I=0; I < nbatches; I++) {
        covar=covar+(1.0/(nbatches-1))*(combo[i]-comean)*
                            (combo[i]-comean);
        }
        if (0) {
            fprintf(outfile, "%lf, %0.10lf\n", p, covar);
        }
        if (covar < covarexact) {
            opt_p=p;
            covarexact=covar;
            comeanexact=comean;
        }
    }
        comean=comeanexact;
        covar=covarexact;
    printf("Optimal p=%lf\n\n", opt_p);
    fprintf(outfile, "Optimal p=%lf\n\n", opt_p);
    printf("Grand Combo Estimate=%lf\n\n", comean);
    fprintf(outfile, "Grand Combo Estimate=%lf\n\n", comean);
    printf("Grand Combo Std. Dev.=%lf\n\n", pow(covar*1.0/nbatches, 0.5));
    fprintf(outfile, "Grand Combo Std. Dev.=%lf\n\n", pow(covar*1.0/nbatches, 0.5));
    /* New Grand Combo */ opt_p=0.0;
    covarexact=1000.0;
    for (j=0; j <= 100; j++) {
        p=1.0*j/100;

a1=-1.0*(p*arrnatcov+(1-p)*newarrcov)/arr_var;
        a2=-1.0*(p*depnatdov+(1-p)*newdepcov)/dep_var;

if (0) {
            printf("Estimated a1, a2, p for New Grand Combo=%lf, %lf, %lf\n", a1, a2, p);
            fprintf(outfile, "Estimated a1, a2, p for New Grand Combo=%lf, %lf, %lf/n", a1, a2, p);
        }
        comean=0.0;
        for (I=0; I < nbatches; I++) {
        combo[i]=p*natural[i]+(1-p)*newind[i]+a1*(narrivals[i]-arr_rate)+a2*(ndepart
        comean=comean+(1.0/nbatches)*combo[i];
        }
        covar=0.0;
        for (I=0; I < nbatches; I++) {
        covar=covar+(1.0/(nbatches-1))*(combo[i]-comean)*
                            (combo[i]-comean);
        }
        if (0) {
            fprintf(outfile, "%lf, %0.10lf\n", p, covar);
        }
```

```
                if (covar < covarexact) {
                    opt_p=p;
                    covarexact=covar;
                    comeanexact=comean;
                }
        }
            comean=comeanexact;
            covar=covarexact;
/*printf("Optimal New p=%lf\n\n", opt_p);
fprintf(outfile, "Optimal New p=%lf\n\n", opt_p);
printf("New Grand Combo Estimate=%lf\n\n", comean);
fprintf(outfile, "New Grand Combo Estimate=%lf\n\n", comean);
printf("New Grand Combo Std. Dev.=%lf\n\n", pow(covar*1.0/nbatches, 0.5));
fprintf(outfile, "New  Grand  Combo  Std.  Dev.=%lf\n\n",  pow(covar*1.0/nbatches,
0.5));*/
if (0) printf("Total Simulation Time=%lf\n\n", clock-init_time);
if (0) fprintf(outfile, "Total Simulation Time=%lf\n\n", clock-init_time);
fclose (outfile);
}
} customer ()
{
double hold_time;
create ("customer");
if (dep_scv != 0.0) {
if (dep_scv == 1.0) hold_time=expntl(1.0/dep_rate);
if (dep_scv > 1.0) hold_time=hyperx(1.0/dep_rate, dep_variance);
if (dep_scv < 1.0) hold_time=erlang(1.0/dep_rate, dep_variance);
}
if (dep_scv == 0.0) hold_time=1.0/dep_rate;
use(q, hold_time);
ndeps=ndeps+1;
service_time=service_time+hold_time;
number_busy=number_busy-1;
weighted_time=weighted_time+(clock-oldclock)*(number_busy+1);
if (number_busy == ntrunks -1)
        congestion_time=congestion_time+(clock-oldclock);
oldclock=clock;
} mmpp () {
double hold_time;
create ("mmpp");
if (0) fprintf(outfile, "I am creating MMPP arrivals\n");
while (flag1 != 0) {
if (0) fprintf(outfile, "State Low\n");
hold_time=expntl(m_l);
next_event_time=hold_time+clock;
while (clock < next_event_time) {
            hold_time=expntl(1.0/l_l);
            if (clock+hold_time > next_event_time) hold (next_event_time-clock);
```

```
                else {
                        hold (hold_time);
                        set (ev);
                }
                if (0) fprintf(outfile, "Arrival\n");
        }
        if (0) fprintf(outfile, "State High\n");
        hold_time=expntl(m_h);
        next_event_time=hold_time+clock;
        while (clock < next_event_time) {
                hold_time=expntl(1.0/l_h);
                if (clock+hold_time > next_event_time) hold (next_event_time-clock);
                else {
                        hold (hold_time);
                        set (ev);
                }
                if (0) fprintf(outfile, "arrival\n");
        }
        }
}
```

What is claimed is:

1. A modeling system for estimating a blocking probability associated with at least a portion of a model of a network, said blocking probability representing a likelihood that a transmitted signal will arrive at said at least said portion of said model of said network, said modeling system comprising:

an estimator controller that derives:
a direct estimator that is a function of a number of losses and arrivals occurring with respect to said at least said portion of said model of said network during a period of time, and
an indirect estimator that is a function of an offered load with respect to said at least said portion of said model of said network during said period of time; and
a processing controller, associated with said estimator controller, that applies a weighting factor to said direct and indirect estimators to derive said blocking probability, said weighting factor minimizing variance of combined estimates.

2. The modeling system set forth in claim 1 wherein said processing controller uses said blocking probability to one of:
evaluate said at least said portion of said model of said network, and
modify at least one parameter of said model, said parameter representing a physical aspect of said network.

3. The modeling system as set forth in claim 1 wherein said estimator controller uses a ratio of a first quantity of signals transmitted to said at least said portion of said model of said network that are blocked to a second quantity of signals transmitted to said at least said portion of said model of said network that arrive during said time period.

4. The modeling system as set forth in claim 1 further including a memory associated with said estimator controller, said memory stores an arrival rate and an average holding time, and said estimator controller retrieves said arrival rate and said average holding time and derives said offered load as a function thereof.

5. The modeling system as set forth in claim 4 wherein said estimator controller derives said indirect estimator, at least in part, as a function of a quantity of users of said network during said time period.

6. A method of operation of a modeling system for estimating a blocking probability associated with at least a portion of a model of a network, said blocking probability representing a likelihood that a transmitted signal will arrive at said at least said portion of said model of said network, said method of operation comprising the steps of:

retrieving from a memory a number of losses and arrivals occurring with respect to said at least said portion of said model of said network during a period of time;
deriving a direct estimator that is a function of said retrieved number of losses and arrivals and an indirect estimator that is a function of an offered load with respect to said at least said portion of said model of said network during said period of time; and
applying a weighting factor to said direct and indirect estimators to derive said blocking probability, said weighting factor minimizing variance of combined estimates.

7. The method of operation set forth in claim 6 further comprising one of the steps of:
evaluating said at least said portion of said model of said network as a function of said blocking probability, and
modifying at least one parameter of said model as a function of said blocking probability, said parameter representing a physical aspect of said network.

8. The method of operation set forth in claim 6 wherein said deriving step further includes the step of determining a ratio of a first quantity of signals transmitted to said at least said portion of said model of said network that are blocked to a second quantity of signals transmitted to said at least said portion of said model of said network that arrive during said time period.

9. The method of operation set forth in claim 6 further comprising the step of retrieving an arrival rate and an average holding time and determining said offered load as a function thereof.

10. The method of operation set forth in claim 6 further comprising the step of determining said indirect estimator as a function of a quantity of users of said network during said time period.

11. A system for estimating a blocking probability associated with at least a portion of a network, said blocking probability representing a likelihood that a transmitted signal will arrive at said at least said portion of said network, said system comprising:

an estimator controller that derives:
a direct estimator that is a function of a number of losses and arrivals occurring with respect to said at least said portion of said network during a period of time, and
an indirect estimator that is a function of an offered load with respect to said at least said portion of said network during said period of time;
a processing controller, associated with said estimator controller, that applies a weighting factor to said direct and indirect estimators to derive said blocking probability, said weighting factor minimizing variance of combined estimates; and
a routing controller that routes signals within said network as a function of said blocking probability.

12. The system set forth in claim 11 wherein said processing controller uses said blocking probability to one of evaluate said at least said portion of said network, and modify at least one parameter of said network.

13. The system as set forth in claim 11 wherein said estimator controller uses a ratio of a first quantity of signals transmitted to said at least said portion of said network that are blocked to a second quantity of signals transmitted to said at least said portion of said network that arrive during said time period.

14. The system as set forth in claim 11 further including a memory associated with said estimator controller, said memory stores an arrival rate and an average holding time, and said estimator controller retrieves said arrival rate and said average holding time and derives said offered load as a function thereof.

15. The system as set forth in claim 14 wherein said estimator controller derives said indirect estimator as a function of a quantity of users of said network during said time period.

16. The system as set forth in claim 11 wherein said at least said portion of said network is a switch and said signal includes at least one of voice data and non-voice data.

17. A method of operation of a system for estimating a blocking probability associated with at least a portion of a network, said blocking probability representing a likelihood that a transmitted signal will arrive at said at least said portion of said network, said method of operation comprising the steps of:

sensing a number of losses and arrivals occurring with respect to said at least said portion of said network during a period of time, and deriving a direct estimator that is a function of said sensed number of losses and arrivals, and an indirect estimator that is a function of an offered load with respect to said at least said portion of said network during said period of time;

applying a weighting factor to said direct and indirect estimators to derive said blocking probability, said weighting factor minimizing variance of combined estimates; and routing signals within said network as a function of said blocking probability.

18. The method of operation set forth in claim 17 further comprising one of the steps of:

using said blocking probability to one of evaluate said at least said portion of said network, and modifying at least one parameter of said network.

19. The method of operation set forth in claim 17 further comprising the step of determining a ratio of a first quantity of signals transmitted to said at least said portion of said network that are blocked to a second quantity of signals transmitted to said at least said portion of said network that arrive during said time period.

20. The method of operation set forth in claim 17 wherein said system further includes a memory that stores an arrival rate and an average holding time, and further includes the step of retrieving said arrival rate and said average holding time and deriving said offered load as a function thereof.

21. The method of operation set forth in claim 20 wherein said indirect estimator is derived as a function of a quantity of users of said network during said time period.

* * * * *